March 26, 1935.    J. H. CLARK    1,995,634
WASHING APPARATUS
Original Filed March 14, 1933    2 Sheets-Sheet 1

Inventor:
Jesse H. Clark,
by Charles E. Mullen
His Attorney.

March 26, 1935. J. H. CLARK 1,995,634

WASHING APPARATUS

Original Filed March 14, 1933 2 Sheets-Sheet 2

Inventor:
Jesse H. Clark,
by Charles E. Tullar
His Attorney.

Patented Mar. 26, 1935

1,995,634

UNITED STATES PATENT OFFICE 1,995,634

WASHING APPARATUS

Jesse H. Clark, Cicero, Ill., assignor to Walker Dishwasher Corporation, Chicago, Ill., a corporation of Delaware Application March 14, 1933, Serial No. 660,683

15 Claims. (Cl. 141—9)

My invention relates to washing apparatus, more particularly to dishwashing apparatus, and has for its object the provision of improved apparatus of this character.

More specifically, my invention relates to dishwashing apparatus wherein a cleansing fluid, such as water, is circulated or hurled through the washing chamber or vat by suitable power driven means, such as a motor driven impeller, and has as one of its objects the provision of improved means for supplying the washing vat with a predetermined quantity of cleansing water so that the most efficient cleansing action will be effected.

Another object of my invention is the provision of improved means for draining the vat of soiled cleansing fluid after the washing operation has been finished.

In carrying out my invention in one form thereof, I provide suitable conduits for supplying the washing vat with a fresh cleansing fluid, and for draining the soiled fluid from the vat after the cleansing operations have been effected. Suitable valve means are provided for controlling these conduits so as to establish communication between the fluid supply conduit and the vat or between this conduit and the drain conduit whereby the supply fluid can be diverted from the vat to the drain.

The valve means for these conduits is controlled in accordance with the load imposed on the motor in driving the fluid circulating means in the vat, that is, in accordance with the quantity of water that has been supplied to and allowed to accumulate in the vat, so as to divert the fluid from the vat when a predetermined quantity has been supplied. For this purpose, a suitable electromagnetic device is provided for operating the valve means to a controlling position to establish communication between the fluid supply and drain conduits when a sufficient quantity of fluid has been supplied to the vat to impose a load of predetermined magnitude upon the fluid circulating means driving motor. In this manner, a predetermined quantity of washing fluid is measured and supplied to the vat. Preferably, the electromagnetic device will be operated in accordance with an operating condition of the motor, such as the magnitude of the motor armature current.

In order to drain the vat of soiled cleansing fluid after the cleansing actions have been effected, a valve controlled drain port is provided in the vat and in one form of my invention an aspirator is provided in the fluid passageway between the fluid supply and drain conduits arranged so that when fluid is flowing from the supply to the drain conduit and the main drain valve is open, an aspirator action will be effected whereby movement of the soiled fluid from the vat is caused by the flow of water from the supply conduit through the aspirator.

In another form of my invention a suitable mechanical pump is provided for withdrawing the soiled water from the vat. In this form, I also provide a pump for forcing water into the vat under pressure. This pump is separated from the drain pump so that it is impossible for the fluid supply pump to become contaminated by the soiled fluid that flows through the drain pump.

In either form of the invention the drain valve controlling the drain port is operably associated with the valve mechanism controlling the fluid supply and drain conduits so that when the drain valve is closed, the electro-magnetic device is conditioned to effect the subsequent operation of the valve mechanism to divert the fluid supply from the vat to the drain when a predetermined quantity of fluid has been supplied to the vat.

For a more complete understanding of the invention reference should be had to the accompanying drawings, in which.

Referring to Figs. 1 to 5, inclusive, the invention in one form is shown in connection with dishwashing apparatus comprising an upright washing chamber or vat 10 for receiving dishes and like utensils to be cleansed and also some suitable washing fluid, such as hot cleansing water. The vat 10 is provided with an inverted frusto-conical bottom wall 11, preferably formed integrally with the side walls of the vat. While the vat and its bottom wall may be formed of any suitable material, I prefer to form them from a suitable sheet metal, such as a rust resisting steel, which preferably will be plated or enameled.

Figure 1:
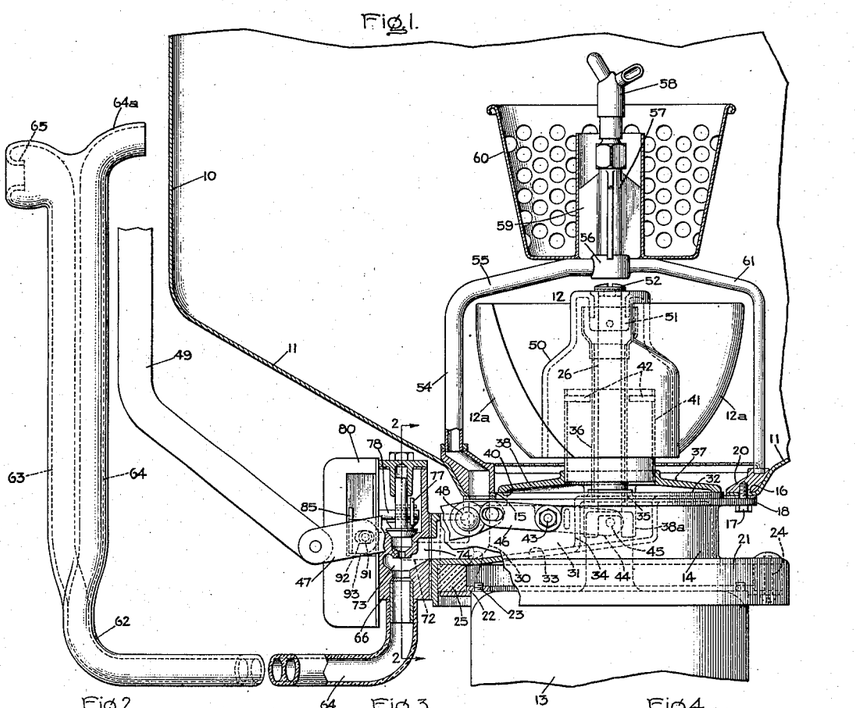
Fig. 1 is a fragmentary elevation of dishwashing apparatus embodying the invention, portions being shown in section and portions being broken away so as to illustrate certain structural details.

It will be understood that suitable supporting openwork trays or baskets (not shown) will be provided in the vat for supporting the dishes and other utensils to be washed.

It will also be understood that the vat 10 will be provided with a suitable supporting casing or framework (not shown) so as to be held in a substantially vertical position and at a convenient height.

In the lower portion of the vat 10 and preferably arranged so as to be substantially embraced by the bottom wall 11 is a suitable impeller 12 which preferably will be driven by a suitable electric motor 13 arranged on the exterior of the vat below the bottom wall 11.

It will be understood that the impeller will be provided with blades 12a which may have any suitable shape, the important feature being that the blades be given a shape such that a cleansing fluid in the lower portion of the vat will be thrown upwardly and outwardly in an efficient manner through the dish-supporting trays by the rotary motion of the impeller. The impeller will be formed from suitable material, such as cast-aluminum or pressed steel.

The motor 13 is supported by the bottom wall 11 of the vat by means of a supporting frame 14. As shown, the bottom inclined wall of the vat terminates in a circular opening 15 that is surrounded by a circular inturned flange 16.

The frame 14 is secured to the flange 16 by means of a plurality of circumferentially spaced bolts 17 which are passed through suitable apertures provided for them in the flange 18 provided on the upper end of the frame 14 and also suitable apertures provided for them in the flange 16. The bolts 17 are received in a clamping ring 20 supported on the upper surface of the flange 16.

The frame 14, as shown, is provided with a depending skirt 21 of enlarged diameter. This skirt serves to secure and support the motor 13. As shown, the upper end of the motor is secured to a suitable supporting ring 22 by means of suitable screw fastening means 23 and this ring in turn is secured to said skirt by means of suitable screw fastening means 24. Interposed between the supporting ring 22 and the upper wall of the skirt is a suitable resilient spring member 25.

The motor 13 is mechanically connected with the impeller 12 by means of a shaft 26 which projects through the opening 15 in the bottom wall of the vat substantially centrally of the vat, that is, so that the shaft 26 rotates substantially in the vertical central axis of the vat.

The frame 14 in addition to serving as a support for the impeller driving motor 13 has several additional functions; it serves to convey fresh cleansing water to the vat 10, and further, serves to conduct soiled water from the vat to a suitable drain. The frame 14, as shown, is provided with an inlet or fresh cleansing fluid supply conduit 30 and with an internal channel or chamber 31 constituting a drain. The top of this chamber or channel opens into the vat through a port 32. The bottom wall 33 of the drain chamber is provided with a central reentrant portion 34. This reentrant portion projects upwardly for some distance into the chamber 31 in a substantially vertical direction and, as shown in Fig. 1, terminates in an opening 35 arranged in the axis of the vat. Within this opening is supported a sleeve 36 which extends upwardly into the vat through the port 32 surrounding the motor shaft 26.

Surrounding the sleeve 36 is a valve 37 arranged to control communication between the vat and the drain chamber 31. This valve 37 is provided with a closure portion 38 which cooperates with a valve seat 40 supported by the frame 14. The valve is further provided with a sleeve 41 extending vertically upwardly from the closure portion and arranged in substantially concentric and spaced relation with the sleeve 36. The space between these members, as is clearly shown in Fig. 1, communicates directly with the drain chamber 31 and hence functions as an overflow passageway for the cleansing fluid or other liquid introduced into the vat 10.

The valve 37 moves vertically between its closed and open positions, and is guided in its movement by means of a plurality of spaced guide members 42 that project inwardly from the sleeve portion 41 and slidably engage the outer surface of the tubular member 36.

A suitable valve operating member is provided, this member, as shown, comprising a horizontally disposed operating shaft 43 which has a portion extending into the drain chamber 31. This portion carries an operating crank 44 which carries a pin 45 that cooperates with an arm 38a depending from the valve. Outside of the drain chamber the shaft 43 carries a crank arm 46 which is connected with a pivoted operating lever 47. This lever 47, as shown, is fixedly pivoted to a pin 48 whereby when the lever 47 is rotated the shaft 43 will be rotated to operate the valve 37 connected with it. A manually operable rod 49 is connected with the lever 47 for operating it to control the position of the valve 37.

The blades 12a of the impeller, as shown, are carried by an apron-like member 50 which is arranged exteriorly of the valve sleeve 41 and spaced from it sufficiently to avoid any possible interference by the valve to the rotation of the impeller or by the impeller to the opening and closing movement of the valve.

The apron-like member 50 tapers inwardly at its upper end where it is secured to the motor shaft 26. As shown, the upper end of the apron-like member is provided with a reentrant portion 51 which embraces the motor shaft. The impeller is secured to the shaft by means of a suitable screw 52.

The above-described arrangement of the bushing 14, the centrally arranged drain port 32, the centrally arranged valve for the drain port, the impeller provided with its apron surrounding the drain valve and providing for movement of the valve within it, all are described and claimed in the copending application of Karl K. Huppmann, Serial No. 657,781, filed February 21, 1933, and assigned to the same assignee as this invention.

The fluid supply conduit 30 of the bushing 14 communicates with a vertically arranged conduit 54, the upper end portion 55 of which turns inwardly and terminates in a chamber 56 arranged in the central axis of the vat. This chamber 56 communicates with a vertically arranged conduit 57 which in turn communicates with and supports a spray device 58 of the reaction type. The conduit 57 carries vanes 59 which support a suitable utensil receiving basket 60. The chamber 56 is supported on its side opposite the conduit 54, 55 by means of a suitable standard 61. It will be observed that by reason of this arrangement fluid which is supplied to the conduit 30 will flow upwardly through the conduits 54, 55 and 57 to the reaction spray device 58. This arrangement of the supply conduits 54, 55, 57 and of the reaction spray device 58 is described and claimed in my co-pending application, Serial No. 653,243, filed January 24, 1933 and assigned to the same assignee as this invention.

As pointed out, an important feature of the invention is the provision of suitable means for supplying the washing vat 10 with a predetermined quantity of cleansing fluid. It will be understood that for a given impeller and for a vat of given shape and proportions, a definite quantity of water is required for the most efficient cleansing action on the utensils supported in the vat. If the quantity supplied be materially more or less than the requisite quantity, the cleansing operation will be less efficient.

Figure 2:
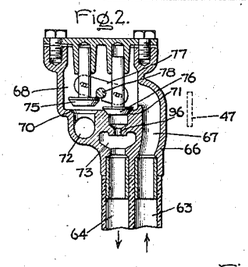
Fig. 2 is a sectional view taken through the line 2—2 of Fig. 1.

For the purpose of supplying the vat with a cleansing fluid, I provide a suitable conduit member 62 arranged with a pair of conduits 63 and 64. The conduit 63 constitutes a fluid supply conduit and is provided at its upper end, as shown, with a suitable nipple 65 whereby it may be conveniently applied to a water faucet such as is usually found in the average household. This passageway 63 at its other end communicates with a conduit and valve housing 66 which, as shown, is provided with a conduit 67 communicating with the conduit 63. The conduit 67 terminates in a chamber 68 which, as shown, is provided with two valve controlled ports 70 and 71. The port 70 communicates with a conduit 72 which in turn communicates with the fluid supply conduit 30 arranged in the frame 14. The port 71 communicates with a chamber 73 which in turn, as shown in Fig. 2, communicates with the drain conduit 64. This chamber also communicates with the drain chamber 31 in the frame 14 through a port 74.

The ports 70 and 71 are controlled by means of valves 75 and 76 which are mechanically interlocked so that only one of the valves can close its associated port at a time. As shown, the valves 75 and 76 are mechanically connected with a suitable operating lever 77 which is mounted upon a suitable operating shaft 78. It will be observed by reason of the foregoing arrangement that when the valves are in their respective positions shown in Fig. 2 and if fluid be supplied through the conduit 63, this fluid will flow into the chamber 68, and from this chamber will flow through the port 70, the conduit 72, and thence through the conduit 30 to the conduits 54, 55 and 57 and the reaction spray device 58, from which it will issue and flow into the vat. On the other hand, when the valves are in their opposite controlling positions, that is, when the valve 75 is closed and the valve 76 is opened, fluid which is supplied from the conduit 63 will flow directly into the drain conduit 64.

In other words, the fluid which is being supplied by the conduit 63 can be diverted from the vat to the drain conduit 64 merely by operating the valves to close the port 70 and to open the port 71.

The valves are operated in accordance with a condition of operation of the fluid circulating means, more specifically, in accordance with the armature current of the impeller driving motor 13, so that when a predetermined quantity of water has been supplied to the vat and hence, when a predetermined load has been imposed on the impeller driving motor 13, the valves will be operated to close the port 70 and to open the port 71. This, as has been previously pointed out, will divert the water flowing through the conduit 63 from the vat to the drain conduit 64.

As shown, the valve operating shaft 78 protrudes into a suitable housing 80 where an operating lever 81 is secured to the shaft. This operating lever is biased in a counter-clockwise direction so as to move the valves to their controlling positions to close the port 70 and to open the port 71 by means of a suitable tension spring 82. Suitable means are provided for locking the valves in their other controlling positions, that is, in their positions to open the port 70 and to close the port 71. This means comprises a suitable latch 83 which cooperates with a detent 84 provided in the operating lever 81 so that when the valves are in their positions shown in Fig. 2 to open the port 70 and to close the port 71, the latch 83 will engage the detent 84 to lock the valves against the force applied by the tension spring 82 (see Fig. 3). The latch 83 is pivotally mounted upon a suitable lever 85, which is mounted to rotate freely on the shaft 78. The latch is biased to its latching position by means of a compression spring 86. It will be observed that when the lever 85 is in its position shown in Fig. 3, the latch will be supported in such a position that it can engage the detent 84 so as to lock the valves in their respective positions shown in Fig. 2.

Figure 3:
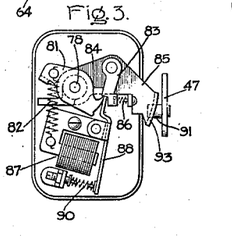
Fig. 3 is an elevation illustrating certain control mechanism used in the dishwashing apparatus of Fig. 1.
Figure 4:
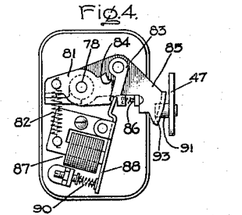
Fig. 4 is a view similar to Fig. 3, but illustrating the control mechanism in a different operative condition.

Suitable means are provided for releasing the latch to unlock the lever 81 when a predetermined quantity of fluid has been supplied to the vat. For this purpose, an electromagnetic device 87 is provided to move the latch to its disengaging position. As shown, the armature 88 of this device is arranged to engage the latch 83 so that when the electromagnetic device is energized, the armature will be moved to disengage the latch from the lever 81. The armature 88 is biased away from its retracted position by means of a compression spring 90.

The lever 85 is provided to return the valves from their controlling positions in which the port 70 is closed and the port 71 opened after they have been moved to these positions by the spring 82 and for this purpose, the lever 85 is mechanically connected with the main drain valve operating mechanism. The lever 85, as shown, protrudes from one side of its housing 80. The valve operating lever 47 is provided with a pin 91 which as shown clearly in Fig. 1, is received in an elongated slot 92 provided for it in an ear 93 carried by the protruding end of the lever 85, whereby when the lever 49 is moved to actuate the valve 37, movement will also be imparted to the lever 85. This arrangement is such that when a predetermined quantity of water has been supplied to the vat and the lever 81 has been released to move to its position shown in Figs. 4 and 5 so as to move the valves 75 and 76 to shut off the water from the vat, and then subsequently, the lever 49 is operated to open the drain valve 37 to drain the vat, the lever 85 will be carried from its position shown in Fig. 4, which corresponds to the closed position of the drain valve, to its position shown in Fig. 5. This will carry the latch 83 to such a position that it again can engage its detent 84 provided in the lever 81. Thus, when the rod 49 is moved to close the drain valve 37 for a subsequent washing operation the levers 85 and 81 will be returned to their positions shown in Fig. 3, thereby conditioning the control mechanism for the valves 75 and 76 for the subsequent washing operation.

Figure 5:
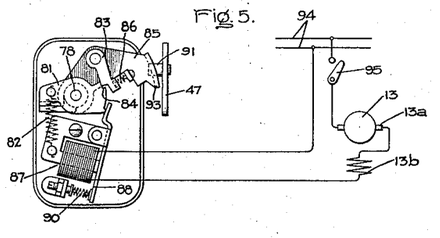
Fig. 5 is a view similar to Figs. 3 and 4, but illustrating the control mechanism in still another operative condition, and also showing diagrammatically the motor provided in the apparatus of Fig. 1 for driving the fluid circulating means in the vat and the electrical connections between the control mechanism of Figs. 3 and 4 and the motor.

As shown diagrammatically in Fig. 5, the operating coil of the electromagnetic device 87 is connected in series with the armature circuit 13a and field winding 13b of the impeller driving motor 13. As shown, the motor 13 is energized from a suitable source of electrical supply 94. A controlling switch 95 is provided in the connections between the motor and the supply source 94.

In the operation of the fluid measuring means, it will be understood that when it is desired to supply the vat with a predetermined quantity of cleansing fluid the drain valve 37 will be closed and the nipple 65 will be connected with a suitable faucet of a cleansing fluid supply source, such as a hot water supply. Under these conditions, the various elements of the valve operating mechanism will be in their respective operative positions shown in Fig. 3. As shown in Figs. 2 and 3, under these conditions, the valves 75 and 76 will be in their operative positions to open the port 70 and close the port 71. When water is turned on, the supply fluid will flow through the conduit 63, the port 70, the conduit 72, the conduit 30 and thence through the conduits 54, 55 and 57 to the reaction spray device 58. The water issuing from the reaction spray device will be hurled in spray form through the vat and eventually will collect in the lower portion of the vat. As the water continues to flow into the vat and collect in its lower portion, it will impose a gradually increasing load upon the impeller which, of course, will impose an increasing load upon its driving motor 13. As a result of this, the armature current of the motor will steadily increase. Eventually, when a predetermined quantity of water has been supplied to the vat, the load imposed upon the motor will be such that it will cause the armature current to increase to such a value that it will cause the winding of the electromagnetic device 87 to attract its armature from its position shown in Fig. 3 to its retracted position shown in Fig. 4. This operation releases the lever 81 which thereupon is moved quickly from its position shown in Fig. 3 to its position shown in Fig. 4. This operation closes the valve 75 and opens the valve 76. As a result, the water which is flowing through the supply conduit 63 will be diverted from the channel 72 and the vat directly to the drain 64. The water flowing through the conduit 64 will flow outward through the discharge nozzle portion 64a of the conduit and be received in an ordinary sink or other suitable drain receptacle. The appearance of water flowing from the drain passageway constitutes a visual signal to the attendant that the proper amount of water has been supplied to the vat for the subsequent washing operation.

When the washing operation has been completed and it is desired to drain the vat of the soiled water, the drain valve 37 will be elevated so as to allow the water to flow from the vat down into the drain passageway 31. When the operating rod 49 for the valve is operated so as to open the valve 37, the lever 85 of the valve actuating mechanism will be moved from its position shown in Figs. 3 and 4 to its position shown in Fig. 5. This, as previously pointed out, will bring the latch 83 to such a position that it will again engage its detent 84 provided on the lever 81. Thus, when the rod 49 is subsequently operated to close the valve 37, the lever 85 will be returned to its position shown in Figs. 3 and 4 and in so moving will return the operating lever 81 to its position shown in Fig. 3. This, of course, opens the valve 75 and shuts the valve 76 which conditions the mechanism for a subsequent washing operation.

As previously pointed out, another important feature of the invention is the provision of suitable means for causing the water within the vat to flow out into the drain 64. For this purpose, I provide a suitable aspirator between the fluid inlet and discharge conduits 63 and 64 so that the flow of water from the supply conduit 63 into the drain conduit 64 will withdraw the water from the vat and carry it into the drain 64.

As shown in Figs. 1 and 2, the port 71 communicates with the chamber 73 through a nozzle-like member 96 of restricted area discharging directly into the conduit 64 through the chamber 73. As is well understood by those skilled in the art, the water which flows through the nozzle 96 will reduce the pressure within the chamber 73 because of the increased velocity of the water through the restricted member 96. As a result of this action, the water within the vat will flow into the chamber 73 from which it will be carried by the stream of water flowing through the member 96 into the discharge conduit 64. It will be understood, of course, that water will be supplied to the conduit 63 until the vat has been drained completely.

The above-described method of draining the vat is of considerable importance when the washing apparatus is of a portable character and is not attached to any permanent drainage fixtures. By reason of the foregoing arrangement, the conduit member 62 may be used to discharge into any suitable sink which may be located at a considerable distance above the lever of the drainage chamber 31.

Figure 6:
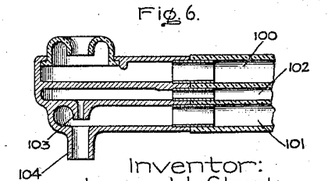
Fig. 6 is a fragmentary view, mainly in section, of a modified form of a fluid aspirator used in the apparatus of Fig. 1.

If desired, the aspirator, rather than being provided in the housing 66, may be provided in the conduit member 62 at its discharge end. An arrangement of this type is shown in Fig. 6. As shown in this figure, the flexible conduit member will be provided with three passageways rather than with two, as shown in Fig. 1. The passageway 100 constitutes the fluid supply passageway and the passageway 101 constitutes a passageway communicating directly with the discharge chamber 31 of the washing apparatus; the passageway 102 communicates with the valve port 71. It will be understood that in this case the valve port 71 will not communicate with the conduit 102 through an aspirator, but will be connected directly with it.

The conduit 102 communicates with the conduit 101 through a nozzle 103 which, as shown, discharges into the discharge nozzle 104 provided for the drain conduit 101. In view of the foregoing arrangement, it will be understood that when a predetermined quantity of fluid has been supplied to the vat and the valve operating mechanism for the valves 75 and 76 has operated the valves in the manner above-described to divert the water from the vat, the fluid supply will be returned through the conduit 102. The water flowing through the conduit 102 will flow from this conduit through the aspirator 103 and thence through the discharge portion 104. This will cause a low pressure area at the discharge end of the drain conduit 101 which will effect the withdrawal of water from the vat wherein the drain valve 37 is opened.

It will be understood that when it is desired to wash dishes or other utensils that these members will be placed within their racks in the vat, the drain valve 37 will be closed, the motor switch 95 closed and the water supply turned on; a predetermined quantity of water will be supplied to the vat as above described. Usually when the water appears at the discharge nozzle 64a, the attendant will cut off the water supply. Then the washing impeller motor will function to throw the water supplied to the vat upwardly and outwardly through the racks to effect a thorough cleansing action on the dishes.

When the dishes have been thoroughly cleansed, the rod 49 will be operated so as to open the drain valve, and the water supply faucet will again be turned on. This operation will supply water, as previously described, to provide the aspirator action that functions to carry the soiled water from the vat and into the drain.

After this the drain valve 37 will be closed which will condition the apparatus for a subsequent washing operation.

Figure 7:
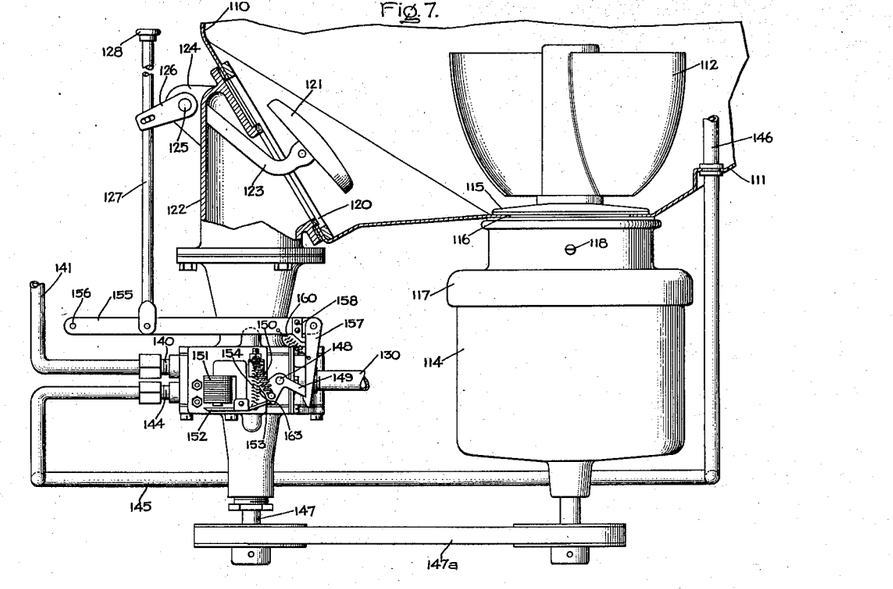
Fig. 7 is a fragmentary view in elevation of washing apparatus embodying a modified form of the invention.

In Figs. 7, 8, 9 and 10 a modified form of the invention is shown. As shown in Fig. 7, the vat 110 of this form is provided with an inverted frusto-conical bottom wall 111. A suitable impeller 112 is arranged in the central vertical axis of the vat and is driven by a motor 114 which is supported by the bottom wall of the vat by means of a suitable bushing 115 which is mounted in a centrally arranged aperture 116 provided for it in the bottom wall. The motor is connected directly to a frame 117 which in turn is mechanically connected with the bushing 115 by means of suitable circumferentially spaced set screws 118.

Also arranged in the bottom wall of the vat is a suitable drain port 120 which is provided with a drain valve 121. The drain port 120 communicates with a drain conduit 122.

The drain valve is carried by means of an arm 123 which, as shown, is pivotally mounted on ears 124 carried by the conduit housing 122. The arm 123 is secured to a shaft 125; also connected with this shaft is an operating lever 126. The lever 126 is rigidly secured to the shaft so that the valve can be moved between its open and closed position by rotating the lever 126. This lever is mechanically connected with a valve operating rod 127 which is provided with a handle or knob 128 whereby it may be conveniently operated.

A fluid supply conduit 130 communicates with a suitable valve control device whereby under certain conditions of operation, fluid flowing from the supply conduit 130 is directed to the vat and under other conditions of operation is diverted from the vat and into a suitable drain.

Figures 8, 9, 10:
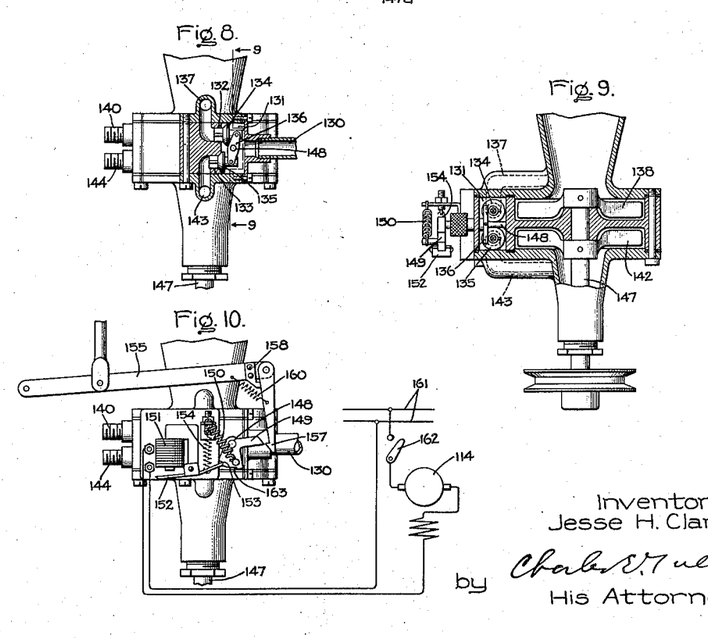
Fig. 8 is a fragmentary view in elevation of a portion of the apparatus of Fig. 7, portions being shown in section so as to illustrate certain structural details.
Fig. 9 is a view similar to Fig. 8, portions being shown in section on a line taken through the line 9—9 of Fig. 8.
Fig. 10 is a view in elevation of a portion of the washing apparatus of Fig. 7, and also showing in diagrammatic form a motor used in this washing apparatus, together with certain control mechanism also used in this apparatus and arranged in accordance with the invention.

As shown in Fig. 8, the supply conduit 130 communicates with a chamber 131 of a suitable valve housing. In this chamber are arranged a pair of ports 132 and 133 which are provided with controlling valves 134 and 135, respectively. These valves are arranged as are the valves 75 and 76 of the form of the invention shown in Figs. 1 to 5 inclusive, that is, they are mechanically interlocked by means of a lever 136 so that only one of the valves can close its associated port at a time. The valve port 132 communicates with a conduit 137 which in turn communicates with the intake of a suitable pump 138 (Figs. 8 and 9). The discharge 140 of this pump communicates with a suitable drain conduit 141 (Fig. 7). The valve port 133 communicates with the intake of a suitable pump 142 by means of a conduit 143. The discharge 144 of this pump communicates with a conduit 145 which in turn communicates with the vat, as clearly shown in Fig. 7.

It will be understood that the conduit 145 will communicate with an upright conduit 146 in the vat which is similar to the conduit 54, 55 of Fig. 1 and which in turn communicates with a reaction spray device of the same construction as that shown in Fig. 1.

As shown in Fig. 7, the conduit 122 also communicates with the intake of the drain pump 138. As shown in this figure, it is preferable that the pump structure together with the valves 134 and 135 and their associated mechanism be supported directly by the drain conduit 122.

It will be understood that the fluid supply conduit 130 and the drain conduit 141 may be formed in a flexible member (not shown) similar to the supply and drain conduits 63 and 64 shown in Fig. 1.

Preferably, the pumps 138 and 142 will be mounted upon a common operating shaft 147 which is mechanically connected with the impeller driving motor 114 by means of a belt drive 147a. The pump chambers, however, are completely separated so that it is impossible for the fresh water supply pump to become contaminated by the soiled water which is forced through the drain pump 138.

The lever 136 is mounted upon a suitable shaft 148 which protrudes from the chamber 131 to the exterior of the valve housing, as shown in Figs. 7 and 10. Mounted on the protruding portion of the shaft 148 is an operating lever 149. This lever is biased in a clockwise direction, as viewed in Figs. 7 and 10, by means of a tension spring 150 so as to bias the valves to close the port 133 and to open the port 132. In other words, the spring biases the valves to such operative positions that the fluid supply conduit 130 is connected with the drain conduit 141 rather than with the vat 110.

Suitable means are provided for locking the operating lever 149 in its other controlling position, namely, in that position to close the valve 134 and to open the valve 135. This means comprises an electromagnetic device 151, the armature 152 of which is pivotally mounted, as shown in Figs. 7 and 10, so that it can engage a detent 153 provided in the operating lever 149 to lock the lever in such a position that the valve 134 is closed and the valve 135 is opened. The armature 152 is biased to its locking position by means of a suitable tension spring 154.

The lever 149 is moved in a counter-clockwise direction, as viewed in Figs. 7 and 10, so as to be moved to its controlling position to open the valve 135 and to close the valve 134 by means of suitable mechanism operated by the drain valve operating lever 127. As shown in Fig. 1, the valve operating lever 127 is mechanically connected with a lever 155 at a point intermediate its ends. This lever is fixedly pivoted at one end to a pin 156, and on its free end carries a suitable latch 157. This latch is arranged to engage the operating lever 149 when the drain valve 121 is moved to close its port 120 so as to move the lever 149 to its controlling position wherein the valve 134 is closed and the valve 135 is opened.

The latch 157, as shown, is pivotally secured to the lever 155 and is biased against a suitable stop 158 carried by the lever by means of a suitable tension spring 160. It is to be understood that when the rod 127 is elevated to close the drain valve 121, and to raise the lever 155 and the latch 157, the latch 157 will engage the lever 149 during the initial part of its movement to move it from its position shown in Fig. 7 to its position shown in Fig. 10, and when the lever 149 has been moved to the latter position, the latch 157 will clear the lever 149, as shown in Fig. 10, so as to permit the lever 149 to be subsequently returned to its position shown in Fig. 7 independently of the latch 157.

As shown diagrammatically in Fig. 10, the motor 114 is electrically connected with a suitable source of electrical supply 161 through a suitable controlling switch 162. As also shown in this figure, the operating coil of the electromagnetic device 151 is electrically connected in series with the armature circuit of the motor 114.

Assuming that the various elements of the apparatus are in their respective operative positions shown in Figs. 7, 8 and 9, and it is desired to wash dishes placed within the vat, the drain valve 121 will be moved to its closed position by elevating the valve operating rod 127. This operation of the rod not only will close the drain valve 121, but also will condition the control mechanism provided for the valves 134 and 135 so as to divert the water flowing into the vat from the vat and into the drain when a predetermined quantity of water has been supplied to the vat. That is, when the drain valve is closed, the lever 155 will be moved upwardly so as to move the valve operating lever 149 to close the valve 134 and to open the valve 135. As described previously, the lever 149 will be locked in this position by means of the armature 152.

Then the fluid supply will be turned on and water flowing from the conduit 130 into the housing 131 will flow through the valve port 133 into the conduit 143 and thence into the intake passageway of the pump 142. This water, as previously pointed out, will be pumped through the pump discharge 144 to the conduit 145 and thence into the vat.

Water which is thus fed into the vat will accumulate therein because the drain valve is closed and hence will impose a gradually increasing load on the impeller and its driving motor 114. When a predetermined quantity of water has been supplied to the vat, the armature current of the motor will have been increased to such a value that it will cause the winding of the electromagnetic device 151 to attract its armature 152, thereby releasing the valve operating lever 149.

This lever will be moved under the influence of its spring 150 to close the valve 135 and to open the valve 134. This operation will cut the water off from the vat and will divert the incoming water into the intake of the drain pump 138. This pump will pump the water into the drain conduit 141. If a flexible conduit of the type shown in Fig. 1 be used, water appearing at the discharge of the drain conduit will constitute a visual signal to the attendant that the proper quantity of water has been applied to the vat. If the conduit be connected with a fixed drain, the sound of the water flowing into the drain will constitute an audible signal to the attendant that the proper quantity of water has been supplied.

The valve operating lever 149 after this operation will occupy the position shown in Fig. 7. When the lever is in this position the armature will engage a suitable abutment 163 provided on the lever to limit its motion in the clockwise direction under the influence of the spring 150.

When the washing operation has been completed and it is desired to drain the vat, the rod 127 will be depressed, which operation will open the drain valve 121. The soiled fluid in the vat will then be pumped to the drain 141 by means of the pump 138. At the same time that the rod 127 is depressed, the latch 157 will be moved over the associated end of the lever 149 so as to slide under it as shown in Fig. 7. It will be understood that the latch 157 can be moved over the end of the lever 149 by reason of its pivotal connection with the lever 155. When the drain valve is closed for a subsequent washing operation, the latch 157 will operate the lever 149 to open the valve 135 and to close the valve 134.

When all the water has been drained from the vat, the switch 162 will be thrown so as to de-energize the motor 114.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. Dishwashing apparatus comprising a vat adapted to contain a cleansing fluid, fluid circulating means in said vat to circulate said fluid, conduit means for supplying a cleansing fluid to said vat, conduit means for draining said vat, valve means between said fluid supplying and draining conduit means and means operably associated with said fluid circulating means so as to respond to a condition of operation thereof that varies as the quantity of fluid in said vat acted upon by said fluid circulating means varies controlling the operation of said valve means so as to control the flow of fluid between said fluid supplying and draining conduit means in accordance with the quantity of fluid in said vat.

2. Dishwashing apparatus comprising a vat, conduit means for supplying said vat with a cleansing fluid, power means for circulating the fluid contained in said vat, drain conduit means for said vat and means operably associated with said power means so as to respond to the magnitude of the load imposed on said power means in operating to circulate fluid in said vat controlling said conduit means so as to establish communication between said fluid supply conduit means and said drain conduit means when the load on said power means attains a predetermined high value.

3. Dishwashing apparatus comprising a vat, a fluid supply conduit for said vat, means in said vat for circulating the fluid contained therein throughout said vat, a motor for driving said fluid circulating means, a drain conduit for said vat, valve means between said fluid supply and said drain conduits, and means operably associated with said motor so as to respond to the magnitude of the load imposed on said motor when operating said fluid circulating means so as to establish communication between said conduit means when a predetermined quantity of fluid has been supplied to said vat.

4. Dishwashing apparatus comprising a vat, means for circulating a cleansing fluid contained in said vat, a motor for driving said fluid circulating means, a conduit for conveying a cleansing fluid to said vat, a drain conduit, a valve device between said conduits arranged to establish communication between them and electro-responsive means operably associated with said motor so as to be energized responsively to the magnitude of the armature current of said motor controlling said valve device to establish communication between said conduits when said armature current attains a predetermined magnitude.

5. Dishwashing apparatus comprising a vat, means for circulating a cleansing fluid contained in said vat, a motor for driving said fluid circulating means, a conduit for conveying a cleansing fluid to said vat, a drain conduit for said vat, a drain valve controlling the drainage of fluid through said drain conduit, valve means arranged to establish communication between said fluid supply conduit and said drain conduit and an electro-magnetic device connected in the armature circuit of said motor so as to be energized by the armature current of said motor controlling said valve means to establish communication between said conduits when said armature current attains a predetermined high value.

6. Dishwashing apparatus comprising a vat, means for circulating a cleansing fluid contained in said vat, a motor for driving said fluid circulating means, a conduit for conveying a cleansing fluid to said vat, a drain conduit for said vat, a drain valve controlling the drainage of fluid through said drain conduit, a valve device controlling said conduits arranged when in one position to establish communication between said supply conduit and said vat, and in another position to disconnect the supply conduit from said vat and to connect it with said drain conduit, resilient means biasing said valve device to said second controlling position, means for locking said device in said first controlling position against the force of said resilient means and control means for said locking means operably associated with said motor so as to respond to the magnitude of the load imposed on said motor in circulating fluid in said vat arranged to release said locking means when said load attains a predetermined magnitude, whereupon, said resilient means moves said valve device to said second controlling position.

7. Dishwashing apparatus comprising a vat, means for circulating a cleansing fluid contained in said vat, a motor for driving said fluid circulating means, a conduit for conveying a cleansing fluid to said vat, a drain conduit for said vat, a drain valve controlling the drainage of fluid through said drain conduit, a valve device controlling said conduits arranged when in one position to establish communication between said supply conduit and said vat and in another position to disconnect the supply conduit from said vat and to connect it with said drain conduit, resilient means biasing said valve device to said second controlling position, latching means for locking said device in said first controlling position against the force of said resilient means, electro-responsive means for releasing said latching means operably associated with said motor to respond to the magnitude of the load imposed thereon in circulating fluid in said vat, actuating means for moving said drain valve to its open and closed positions and means operated by said valve actuating means when the latter functions to close said drain valve for moving said valve device to said first controlling position against the force of said resilient means, said latching means then operating to lock said valve device in said first controlling position.

8. In a dishwashing apparatus comprising a vat adapted to contain a cleansing fluid, fluid circulating means in said vat to circulate said fluid, a fluid supply conduit and a fluid drain conduit for said vat, a drain valve controlling the drainage of fluid through said drain conduit, fluid conduit means between said vat and said supply and said drain conduits respectively, fluid conduit means between the fluid supply and said fluid drain conduits arranged to divert fluid flowing in said supply conduit from said vat to said drain conduit, valve means controlling said fluid conduit means between said fluid supply and said fluid drain conduits, and means operably associated with said fluid circulating means so as to respond to a condition of operation thereof that varies as the quantity of fluid in said vat acted upon by said fluid circulating means varies controlling said valve means so as to establish communication between said fluid supply and drain conduits when a predetermined quantity of fluid has been supplied to said vat, said fluid conduit means between said fluid supply and said drain conduits having a portion of restricted area located with respect to the conduit means between said drain conduit and said vat so as to provide aspirator action between the fluid to said vat and that flowing from said supply to said drain conduits whereby movement of fluid from said vat is effected by the flow of fluid from said supply to said drain conduits when said drain valve is open.

9. Dishwashing apparatus comprising a vat, a fluid circulating impeller in said vat, a driving motor for said impeller, a fluid supply conduit and a fluid drain conduit for said vat, fluid conduits between said vat and said supply and said drain conduits respectively, a drain valve controlling the drainage of fluid through said conduit between said vat and said drain conduit, a fluid conduit between said fluid supply and said fluid drain conduits arranged to divert fluid flowing in said supply conduit from said vat to said drain conduit, valve means controlling said fluid conduit between said fluid supply and said fluid drain conduits, and means operably associated with said motor so as to respond to the magnitude of the load imposed thereon in operating said impeller controlling said valve means so as to establish communication between said fluid supply and drain conduits when a predetermined quantity of fluid has been supplied to said vat, said fluid conduit between said fluid supply and said drain conduits having a portion of restricted area located with respect to the conduit between said drain conduit and said vat so as to provide aspirator action between the fluid in said vat and that flowing from said supply to said drain conduits when said valve means has operated to connect said conduits, whereby movement of fluid from said vat is effected by the flow of fluid from said supply to said drain conduit when said drain valve is opened.

10. In a dishwashing apparatus comprising a vat, a fluid conduit connected with said vat, a fluid supply pump having its discharge connected with said fluid conduit so as to be connected with said vat through said conduit, a fluid drain conduit connected with said vat, a fluid drain pump having its intake connected with said fluid drain conduit, a fluid supply conduit connected with the intakes of both of said fluid supply and drain pumps, a pair of valves controlling the flow of fluid from said fluid supply conduit to the intakes of said fluid supply pump and of said fluid drain pump respectively, interlocking means between said valves so that they can be operated to connect said fluid supply conduit to only one of said pumps at a time and means for operating said valves.

11. Dishwashing apparatus comprising a vat adapted to contain a cleansing fluid, fluid circulating means in said vat to circulate said fluid, a fluid conduit connected to said vat, a fluid supply pump having its discharge connected with said fluid conduit so as to be connected with said vat through said conduit, a fluid drain conduit connected with said vat, a drain pump having its intake connected with said fluid drain conduit, a fluid supply conduit connected with the intakes of both of said fluid supply and drain pumps, valve means between said fluid supply conduit and said intakes of said pumps arranged to direct fluid from said supply conduit to either the intake of said fluid supply pump or that of said fluid drain pump, and means operably associated with said fluid circulating means to respond to a condition of operation of said fluid circulating means that varies as the quantity of fluid in said vat varies controlling said valve means in accordance with the quantity of fluid in said vat.

12. Dishwashing apparatus comprising a vat adapted to contain a cleaning fluid, fluid circulating means in said vat to circulate said fluid, a motor for driving said fluid circulating means, a fluid conduit connected with said vat, a fluid supply pump having its discharge connected with said fluid conduit so as to be connected with said vat through said conduit, a fluid drain conduit connected with said vat, a fluid drain pump having its intake connected with said drain conduit, a fluid supply conduit connected with the intakes of both of said pumps, valve means between said fluid supply conduit and said intakes of said pumps arranged to direct fluid from said supply conduit to either the intake of said fluid supply pump or that of said drain pump, and means operably associated with said motor to respond to the armature current of said motor which varies as the quantity of fluid in said vat varies for controlling said valve means to divert water from said fluid supply conduit to said drain pump when a predetermined quantity of fluid has been supplied to said vat.

13. Dishwashing apparatus comprising a vat adapted to contain a cleansing fluid, fluid circulating means in said vat to circulate said fluid, means for supplying fluid to said vat, means for draining said vat and control means for said fluid supply means operably associated with said drain means so as to be conditioned to control said fluid supply means in accordance with the operation of said drain means, and further, operably associated with said fluid circulating means to respond to a condition of operation thereof that varies as the quantity of fluid in said vat varies so as to control the operation of said fluid supply means in accordance with the quantity of fluid in said vat.

14. Dishwashing apparatus comprising a vat adapted to contain a cleansing fluid, fluid circulating means in said vat to circulate said fluid, means for supplying fluid to said vat, a drain valve for said vat, means for operating said drain valve, means operably associated with said fluid circulating means controlling said fluid supply means in accordance with a condition of operation of said fluid circulating means that varies as the quantity of fluid in said vat varies and means operatively associated with said drain valve operating means controlling said fluid supply controlling means in accordance with the operation of said drain valve operating means.

15. Dishwashing apparatus comprising a vat, a conduit for supplying cleansing fluid to said vat, power means for circulating the fluid contained in said vat, a drain conduit for said vat, a drain valve for said vat controlling the drainage of fluid through said drain conduit, means operably associated with said power means so as to respond to the load imposed on said power means in operating to circulate fluid in said vat controlling said fluid supply and drain conduits so as to establish communication between said fluid supply conduit and said drain conduit when the load on said power means attains a predetermined high value and means for withdrawing fluid from said vat when said communication has been established and said drain valve is open.

JESSE H. CLARK.

CERTIFICATE OF CORRECTION.

Patent No. 1,995,634.  March 26,

JESSE H. CLARK.

It is hereby certified that error appears in the printed specification of the above numbered patent requiring correction as follows: Page 7, second column, line 38, claim 8, for "to" read in; and that the said Letters Patent should be read with this correction therein that the same may conform to the record of the case in the Patent Office.

Signed and sealed this 28th day of May, A. D. 1935.

Leslie Frazer (Seal)

Acting Commissioner of Patents.